United States Patent Office 3,499,904
Patented Mar. 10, 1970

3,499,904
METHOD FOR PREPARING YNAMINES
Laurence I. Peterson, Midland, Mich., assignor to The Dow Chemical Company, Midland, Mich., a corporation of Delaware
No Drawing. Filed Aug. 24, 1967, Ser. No. 662,911
Int. Cl. C07c 87/24, 103/12
U.S. Cl. 260—293                                8 Claims

ABSTRACT OF THE DISCLOSURE

In the process of preparing ynamines by reacting by contacting a phenylacetylene with a primary or secondary amine and molecular oxygen, in the presence of a source of copper ions, to produce the ynamines, the improvement comprises adding a reducing agent to the reaction, thereby greatly increasing the ynamine yields.

BACKGROUND OF THE INVENTION

The invention is an improvement of my copending process, Preparation of Ynamines and Phenylacetamides, filed concurrently, Ser. No. 662,865, said process comprising reacting by contacting a phenylacetylene with a primary or secondary amine and molecular oxygen, in the presence of a source of copper ions, to produce the ynamines, the improvement comprising adding a reducing agent to the reaction, thereby greatly increasing the ynamine yields.

The specification of the above copending application is hereby expressly made a part of this application by incorporation by reference.

SUMMARY OF THE INVENTION

The specification of copending application, Ser. No. 662,865, teaches the method of preparing ynamines and phenylacetamides, said method being described above.

My improvement comprises adding a stoichiometric excess, relative to the amount of phenylacetylene, of a soluble reducing agent to the above reaction, regardless of whether a primary or secondary amine is used, during the reaction. This addition, then, will:

(1) Increase the ynamine yield if the reaction utilizes a secondary amine;
(2) Increase the phenylacetamide yield, by increasing the probable intermediate ynamine yield, if a primary amine is used.

The reducing agent used must be soluble and able to reduce $Cu^{++}$ to $Cu^+$. Some examples of the reducing agent are compounds of the formula $NH_2$—NH—R, where R is H, such as hydrazine; where R is an alkyl group, preferably from 1 to 8 carbon atoms, such as methyl hydrazine and propyl hydrazine; or where R is an aryl group, such as phenyl hydrazine. Also, compounds of the formula $R_3N$—$BH_3$, where R is an alkyl group, preferably from 1 to 8 carbon atoms, such as triethylamine borane and tripropylamine borane; or where R is an aryl group, such as triphenylamine borane. And, compounds of the formula

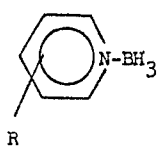

where R is an alkyl group, preferably from 1 to 8 carbon atoms, such as picoline borane, or where R=H, pyridine borane. Also, di-borane, $B_2H_6$.

SPECIFIC EMBODIMENTS

Following are specific embodiments of my improvement, although they are in no way intended to limit same:

EXAMPLE I

Oxidation of phenylacetylene in the presence of diethylamine

Phenylacetylene (5.1 g., 0.050 mole) in 100 ml. of benzene, and 1.25 ml. of 95% hydrazine, were added dropwise over one-half hour to a stirred solution of 2.0 g. (0.010 mole) of cupric acetate monohydrate dissolved in 25 ml. of diethylamine and 100 ml. of benzene at 0° C. A stream of oxygen was continuously passed through the reaction mixture during the addition of the phenylacetylene and for 3 minutes thereafter. Water (50 ml.) was then added to the reaction mixture to precipitate the copper salts. The colorless benzene layer was washed twice with 50 ml. of water and then filtered and dried over calcium sulfate. 1-(diethylamino) - 2 - phenylacetylene was then isolated by removing the benzene under vacuum and by allowing the coproduced diphenylbutadiyne to crystallize from solution at 0° C. The resulting liquid was shown to be the ynamine by comparing its infrared and n.m.r. spectra with authentic material. Analysis revealed the crude reaction product, which, with the residual starting material, represented essentially 100% of the reactants, to have a ratio of ynamine to butadiyne of 9.1.

A run identical to Example I, except that no reducing agent was employed, revealed an ynamine to butadiyne ratio of 0.67.

In other experiments, as disclosed in my copending application named above, the addition of reducing agents increases the ynamine, or corresponding phenylacetamide, yields. This is true even though variations from the indicated experiment are employed, for example, copper catalysts, such as cuprous acetate, cupric stearate, cupric benzoate, and cupric hydroxy benzoate [Cu(OH)(OBz)]; amines, such as dimethylamine, piperidine and ethylamine; inert-substituted phenylacetylenes, such as methyl-phenylacetylene, butyl - phenylacetylene and chlorophenylacetylene; and inert solvents, such as benzene, pyridine and toluene.

The following table shows comparative data for four runs. For all four, phenylacetylene and diethylamine, in a molar ratio of amine/acetylene of 20, were used, and an excess of the amine was the solvent. The concentration of the catalyst, in all cases cupric acetate, was .055 mole/liter. An oxygen pressure of 760 mm. and a reaction temperature of 20° C. was constant in all. Also, 100% conversion of phenylacetylene was always accomplished, the ratio of ynamine/dimer essentially expressing all reaction products.

| Run No. | Reducing agent [1] | Ynamine/dimer [2] |
|---|---|---|
| 106 | None | .76 |
| 119 | $H_2NNH_2$ | 9.00 |
| 120 | $C_6H_5NHNH_2$ | 3.00 |
| 121 | Pyridine-Borane | 1.08 |

[1] Equimolar amount based on phenylacetylene.
[2] Expressed as moles ynamine per mole 1,4-diphenylbutadiyne.

I claim:
1. In the process of preparing an ynamine by reacting a phenylacetylene with a primary or secondary amine and molecular oxygen, in the presence of a catalytic amount of a source of $Cu^{++}$ ions, the improvement which comprises adding a soluble reducing agent which is capable of reducing $Cu^{++}$ to $Cu^+$ during the reaction.
2. The improvement of claim 1 where the reducing agent is of the formula $NH_2$—NH—R, wherein R is an alkyl group of from 1 to 8 carbon atoms, or an aryl group.

3. The improvement of claim 1 wherein the reducing agent is hydrazine.

4. The improvement of claim 1 wherein the reducing agent is phenylhydrazine.

5. The improvement of claim 1 wherein the reducing agent is of the formula $R_3N\text{---}BH_3$, wherein R is an alkyl group of from 1 to 8 carbon atoms, or R is an aryl group.

6. The improvement of claim 1 wherein the reducing agent is of the formula

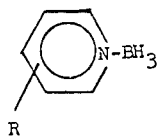

wherein R is an alkyl group of from 1 to 8 carbon atoms.

7. The improvement of claim 1 wherein the reducing agent is pyridine-borane.

8. The improvement of claim 1 wherein the reducing agent is di-borane, $B_2H_6$.

References Cited

UNITED STATES PATENTS

| 3,340,246 | 9/1967 | Viche | 260—112.5 |
| 3,427,354 | 2/1969 | Viche | 260—570.8 |

OTHER REFERENCES

Rose et al., J. Chem. Soc., 1949, 792–6.

HENRY R. JILES, Primary Examiner

G. T. TODD, Assistant Examiner

U.S. Cl. X.R.

260—558, 570.5